United States Patent
Le et al.

(10) Patent No.: US 12,505,856 B2
(45) Date of Patent: Dec. 23, 2025

(54) HIGHLY TEXTURED BUFFER LAYER TO GROW YBIPT (110) FOR SPINTRONIC APPLICATIONS

(71) Applicant: Western Digital Technologies, Inc., San Jose, CA (US)

(72) Inventors: Quang Le, San Jose, CA (US); Brian R. York, San Jose, CA (US); Sharon Swee Ling Banh, San Jose, CA (US); Hassan Osman, San Jose, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/740,054

(22) Filed: Jun. 11, 2024

(65) Prior Publication Data

US 2024/0420733 A1    Dec. 19, 2024

Related U.S. Application Data

(60) Provisional application No. 63/508,164, filed on Jun. 14, 2023.

(51) Int. Cl.
*G11B 5/39*    (2006.01)
*G01R 33/09*    (2006.01)
(Continued)

(52) U.S. Cl.
CPC .......... *G11B 5/3909* (2013.01); *G01R 33/093* (2013.01); *G11C 11/161* (2013.01);
(Continued)

(58) Field of Classification Search
CPC ... G11B 5/3909; G01R 33/093; G11C 11/161; H03K 19/18; H10B 61/00; H10N 50/10; H10N 50/85; H10N 52/80
See application file for complete search history.

(56) References Cited

U.S. PATENT DOCUMENTS 11,283,006 B1 *    3/2022    Freitag .................. G11B 5/3909
2020/0144487 A1 *    5/2020    Zhu ........................ H10N 50/01
(Continued)

OTHER PUBLICATIONS

Shirokura, Takanori et al., "Efficient spin current source using a half-Heusler alloy topological semimetal with back end of line compatibility", Scientific Reports, 2022, pp. 1-10, <https://www.nature.com/articles/s41598-022-06325-1>.

(Continued)

*Primary Examiner* — Daniell L Negron
*Assistant Examiner* — Michelle J. Kim
(74) *Attorney, Agent, or Firm* — Patterson + Sheridan, LLP

(57) ABSTRACT

The present disclosure generally relates to spintronic material stacks and devices. The various disclosed embodiments of YBiPt based spin orbit torque (SOT) stacks can be used for high temperature applications. Disclosed herein are various buffer and/or interlayer configurations in spintronic stacks that can promote growth of YBiPt in the (110) orientation, to promote a high spin Hall angle (SHA) in SOT applications. One embodiment is a spintronic stack comprising a buffer layer comprising one or more layers, the one or more layers each individually comprising: MgO (100), TiN (100), Ta, Nb, HfN, $Ta_3W_2$ (110), $TaW_2$ (100), $Ta_3W_2N$, $TaW_2N$, or heated YPt, an SOT layer comprising YBiPt in the (110) orientation, an interlayer comprising one or more of MgO, $Ta_3WN$, $TaW_3N$, $Ta_3W$ (110), $TaW_3$ (100), YPt (110), NiFeGeN, NiAlN, NiAl, NiFeGe, NiAlGe, or HfN, and a ferromagnetic layer.

31 Claims, 12 Drawing Sheets

(51) Int. Cl.
  *G11C 11/16*   (2006.01)
  *G11C 11/18*   (2006.01)
  *H03K 19/18*   (2006.01)
  *H10B 61/00*   (2023.01)
  *H10N 50/10*   (2023.01)
  *H10N 50/85*   (2023.01)
  *H10N 52/80*   (2023.01)

(52) U.S. Cl.
  CPC .............. *G11C 11/18* (2013.01); *H03K 19/18* (2013.01); *H10B 61/00* (2023.02); *H10N 50/10* (2023.02); *H10N 50/85* (2023.02); *H10N 52/80* (2023.02)

(56) References Cited

U.S. PATENT DOCUMENTS

| | | |
|---|---|---|
| 2021/0056988 A1 | 2/2021 | Chen et al. |
| 2021/0249038 A1* | 8/2021 | Le .......................... H10N 50/85 |
| 2021/0286028 A1 | 9/2021 | Ichikawa et al. |
| 2021/0336127 A1* | 10/2021 | Le .......................... H10N 52/80 |
| 2022/0131068 A1 | 4/2022 | Kalitsov et al. |
| 2023/0063084 A1 | 3/2023 | Pham et al. |

OTHER PUBLICATIONS

International Search Report and Written Opinion for Application No. PCT/US2024/033620 dated Oct. 7, 2024.

* cited by examiner

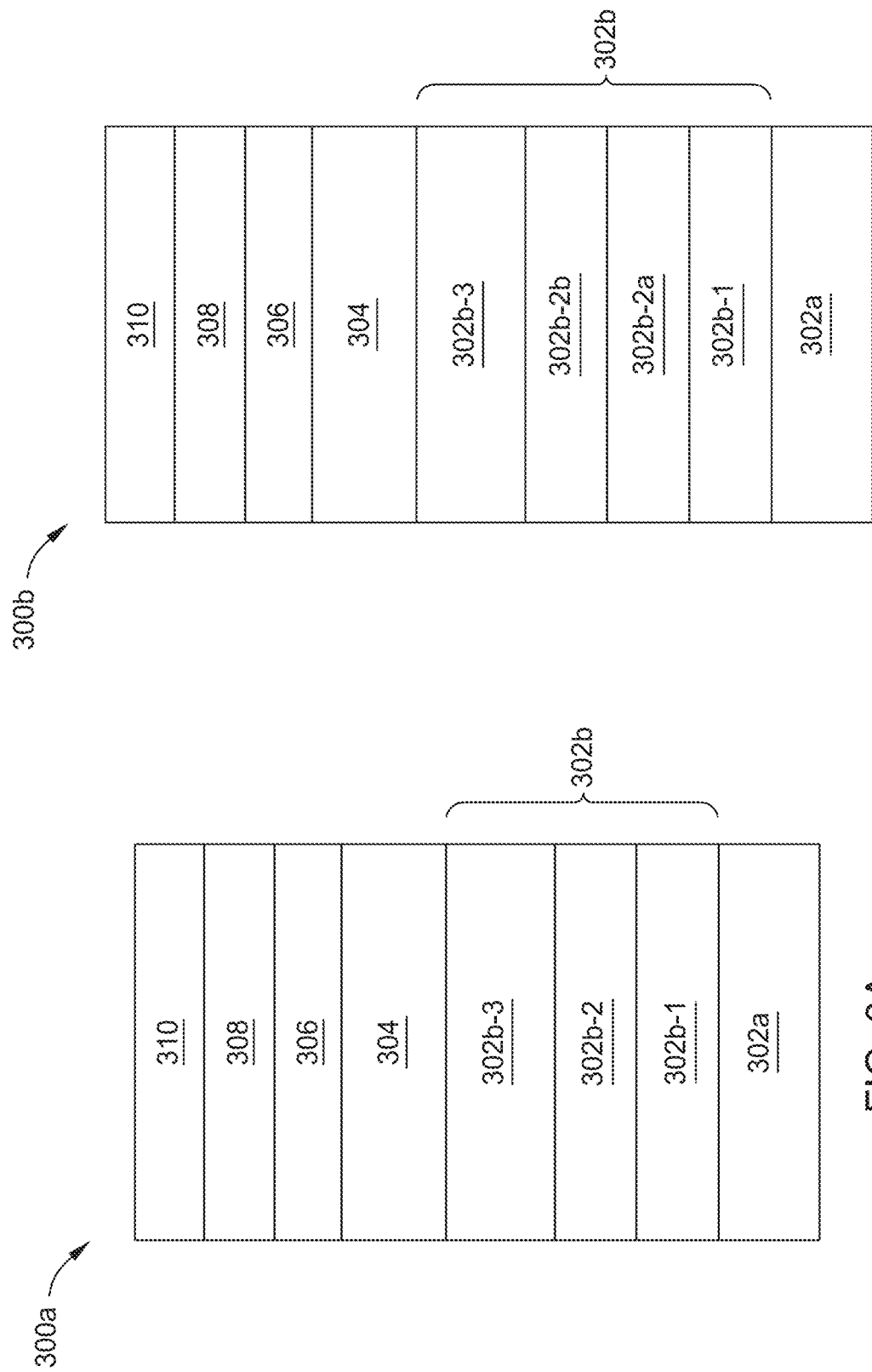

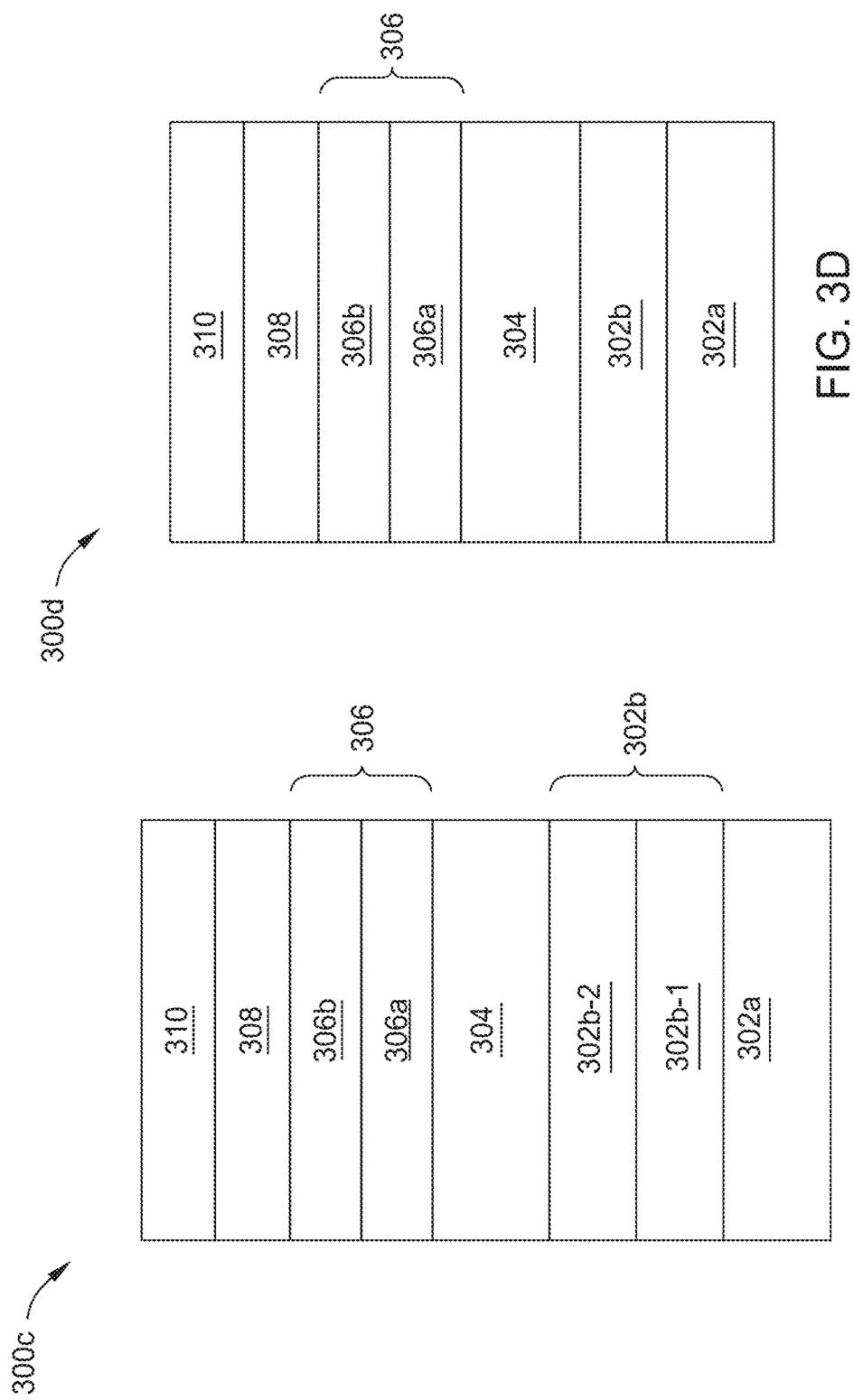

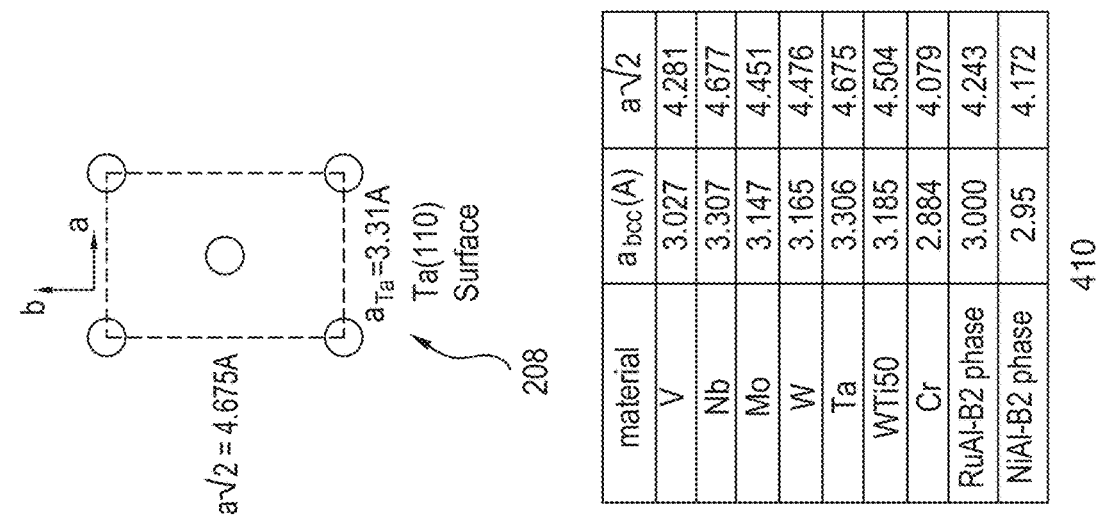
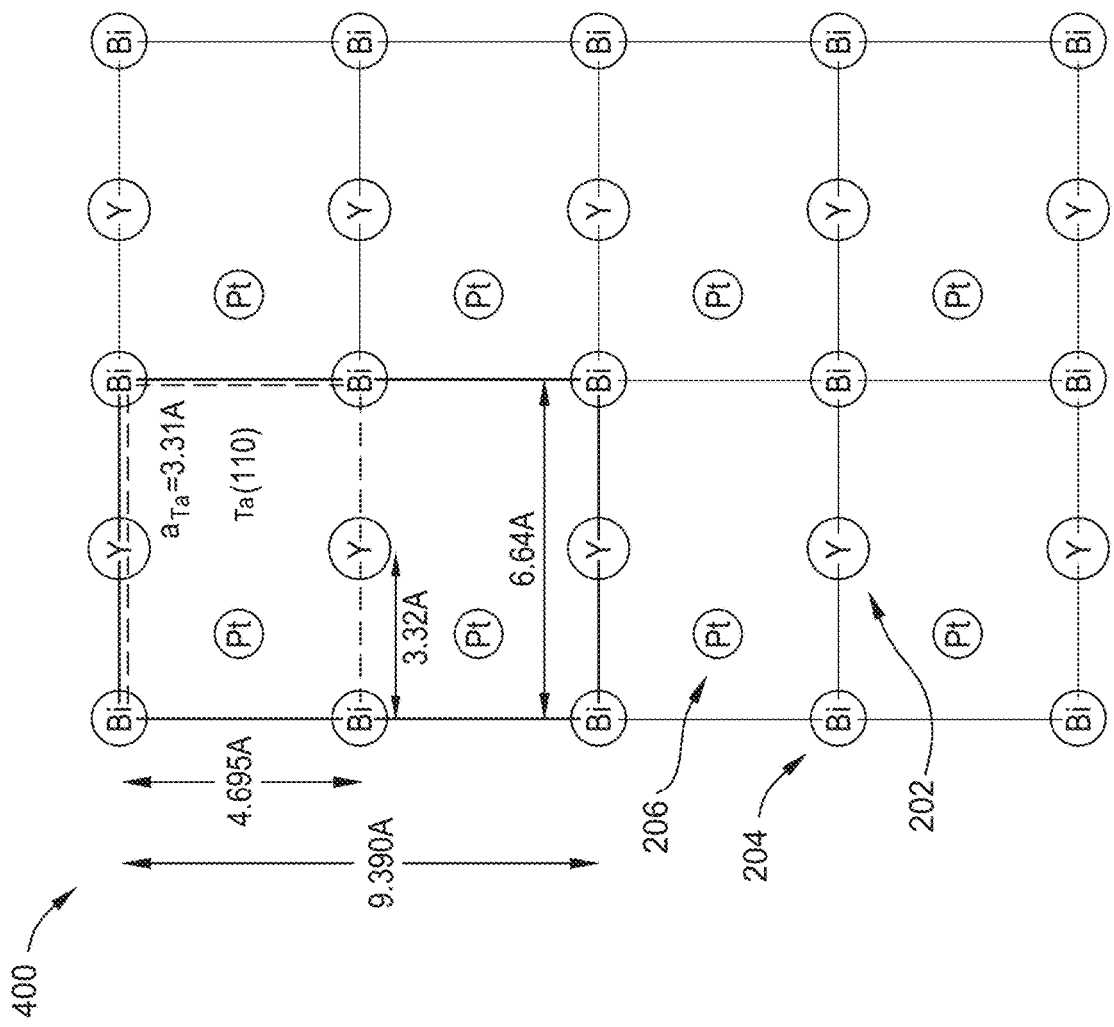
FIG. 4A

HIGHLY TEXTURED BUFFER LAYER TO GROW YBIPT (110) FOR SPINTRONIC APPLICATIONS

CROSS-REFERENCE TO RELATED APPLICATIONS

This application claims benefit of U.S. provisional patent application Ser. No. 63/508,164, filed Jun. 14, 2023, which is herein incorporated by reference.

BACKGROUND OF THE DISCLOSURE

Field of the Disclosure

Embodiments of the present disclosure generally relate to spintronic devices with a textured buffer layer for growing a topological semi-metal material.

Description of the Related Art

Spintronic devices have been used in various sensor, data storage, memory, and logic applications, and have shown promise in recent years to support devices for artificial intelligence applications. Various materials have been attempted in the search for efficient spin Hall effect (SHE) materials for such devices, among which are various topological insulator materials with high spin Hall angles.

YPtBi layers are narrow band gap topological semi-metals having both giant spin Hall effect and high electrical conductivity. YPtBi is a material that has been proposed in various spin-orbit torque (SOT) device applications, such as for a spin Hall layer for magnetoresistive random access memory (MRAM) devices, magnetic recording read heads, sensors, and energy-assisted magnetic recording (EAMR) magnetic recording heads. However, utilizing YPtBi materials in commercial SOT applications can present several obstacles. For example, YPtBi materials require specific buffer layers and/or interlayers, as well as optimal processing conditions, to achieve the desired orientation.

Therefore, there is a need for an improved SOT device utilizing TSM layer(s) having a desired crystal orientation.

SUMMARY OF THE DISCLOSURE

The present disclosure generally relates to spintronic material stacks and devices. The various disclosed embodiments of YBiPt based spin orbit torque (SOT) stacks can be used for high temperature applications. Disclosed herein are various buffer and/or interlayer configurations in spintronic stacks that can promote growth of YBiPt in the (110) orientation, to promote a high spin Hall angle (SHA) in SOT applications. One embodiment is a spintronic stack comprising a buffer layer comprising a textured layer comprising a bcc alloy with lattice spacing in the range of about a=3.15 Å to a=3.32 Å, comprised of one or more materials selected from the group consist of: Ta, Nb, Hf, Mo, V, and W. The alloy options include: (1) forming either (110) or (100) textures like Ta rich Ta—W alloys $Ta_3W_2$ (110); (2) W rich $TaW_2$ (100); and (3) using fcc (100) textured nitride alloys of these elements with lattice spacing in the range of a=4.45 Å to a=4.70 Å, such as $Ta_3W_2N$, $TaW_2N$, or HfN. The buffer layer may further comprise one or more growth template layers of either MgO (100), TiN (100), or RuAl (100), or on a thin layer of heated YPt. The spintronic stack further comprises an SOT layer comprising YBiPt in the (110) orientation disposed over the buffer layer, an optional interlayer disposed over the SOT layer, a ferromagnetic layer disposed over the interlayer, and a capping layer disposed over the ferromagnetic layer.

In one embodiment, a spintronic stack comprises a buffer layer comprising a textured layer comprising Ta or Nb, a spin orbit torque (SOT) layer comprising YBiPt in the (110) orientation disposed over the buffer layer, an interlayer disposed over the SOT layer, and a ferromagnetic layer disposed over the interlayer.

In another embodiment, a spintronic stack comprises a buffer layer comprising a bcc alloy comprising HfN, $Ta_3W$ (110), $TaW_3$ (100), $Ta_3WN$, $TaW_3N$, MgO (100), TiN (100), or YPt, a spin orbit torque (SOT) layer comprising YBiPt in the (110) orientation disposed over the buffer layer, an interlayer disposed over the SOT layer, a ferromagnetic layer disposed over the interlayer, and a capping layer disposed over the ferromagnetic layer.

In yet another embodiment, a spintronic stack comprises at least one amorphous non-magnetic migration barrier layer comprising CoX, CoFeX, NiX, or NiFeX, where X is one of Ta, W, Hf, or Ge, a buffer layer disposed on the at least one amorphous non-magnetic migration barrier layer, the buffer layer comprising (1) a texturing template layer comprising MgO (100), TiN (100), RuAl (100), or YPt disposed over the at least one amorphous non-magnetic migration barrier layer, and (2) two or more textured sub-layers disposed over the texturing template layer, the two or more textured sub-layers each individually comprising a material selected from the group consisting of: a bcc alloy of Ta, W, Nb, V, and Hf, and a fcc alloy nitride compounds of Ta, W, Nb, V, and Hf, a spin orbit torque (SOT) layer comprising YBiPt in the (110) orientation disposed over the buffer layer, an interlayer disposed over the SOT layer, the interlayer comprising a first sub-layer and a second sub-layer, the first sub-layer comprising a material selected from the group consisting of: $Ta_3WN$, $TaW_3N$, $Ta_3W$ (110), $TaW_3$ (100), YPt (110), NiFeGeN, NiAlN, NiAl, NiFeGe, NiAlGe, and HfN, and the second sub-layer being an oxide layer, a ferromagnetic layer disposed over the second sub-layer of the interlayer, and a capping layer disposed over the ferromagnetic layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3D are schematic illustrations of spintronic material stacks according various embodiments.

FIG. 4A is a schematic illustration of lattice matching of YBiPt (110) to Alpha-Ta (110).

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to spintronic material stacks and devices. The various disclosed embodiments of YBiPt based spin orbit torque (SOT) stacks can be used for high temperature applications (>300-600° C.), such as for magnetic sensors, logic designs, and memory cells (e.g., MRAM (Magnetoresistive Random Access Memory)). Such applications require materials to withstand high-temperature fabrication and in-use environments. Disclosed herein are various buffer and interlayer configurations in spintronic stacks that can promote growth of YBiPt in the (110) orientation, to promote a high spin Hall angle (SHA) in SOT applications.

Disclosed in one embodiment is a spintronic stack comprising a buffer layer comprising a textured layer comprising Ta, Nb, HfN, $Ta_3W$ (110), $TaW_3$ (100), or YPt (110), a spin orbit torque (SOT) layer comprising YBiPt in the (110) orientation disposed over the buffer layer, an interlayer disposed over the SOT layer, and a ferromagnetic layer disposed over the interlayer.

Figure 1:
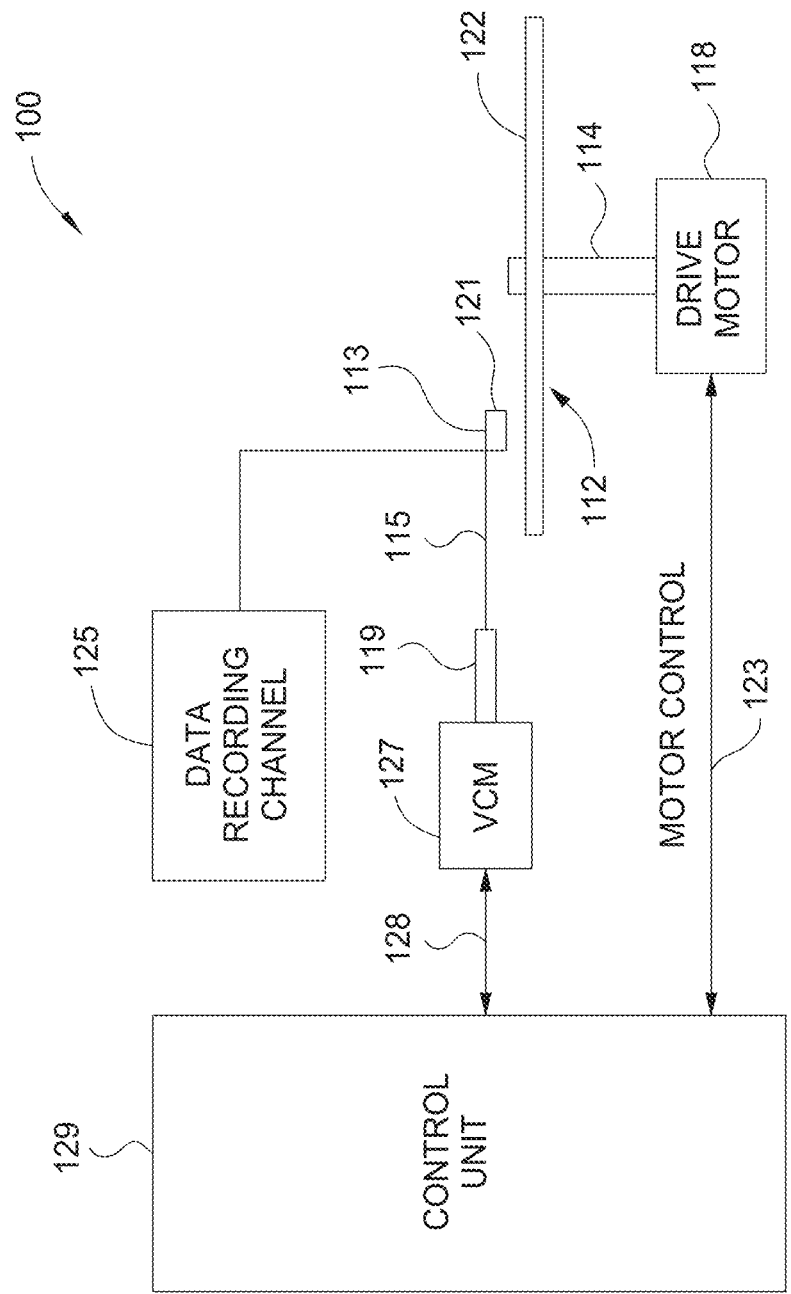
FIG. 1 is a schematic illustration of certain embodiments of a magnetic media drive including a magnetic recording head with a spintronic device.

FIG. 1 is a schematic illustration of certain embodiments of a magnetic media drive 100 including a magnetic recording head with a SOT MTJ device. Such a magnetic media drive may be a single drive or comprise multiple drives. For illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

Figure 2:
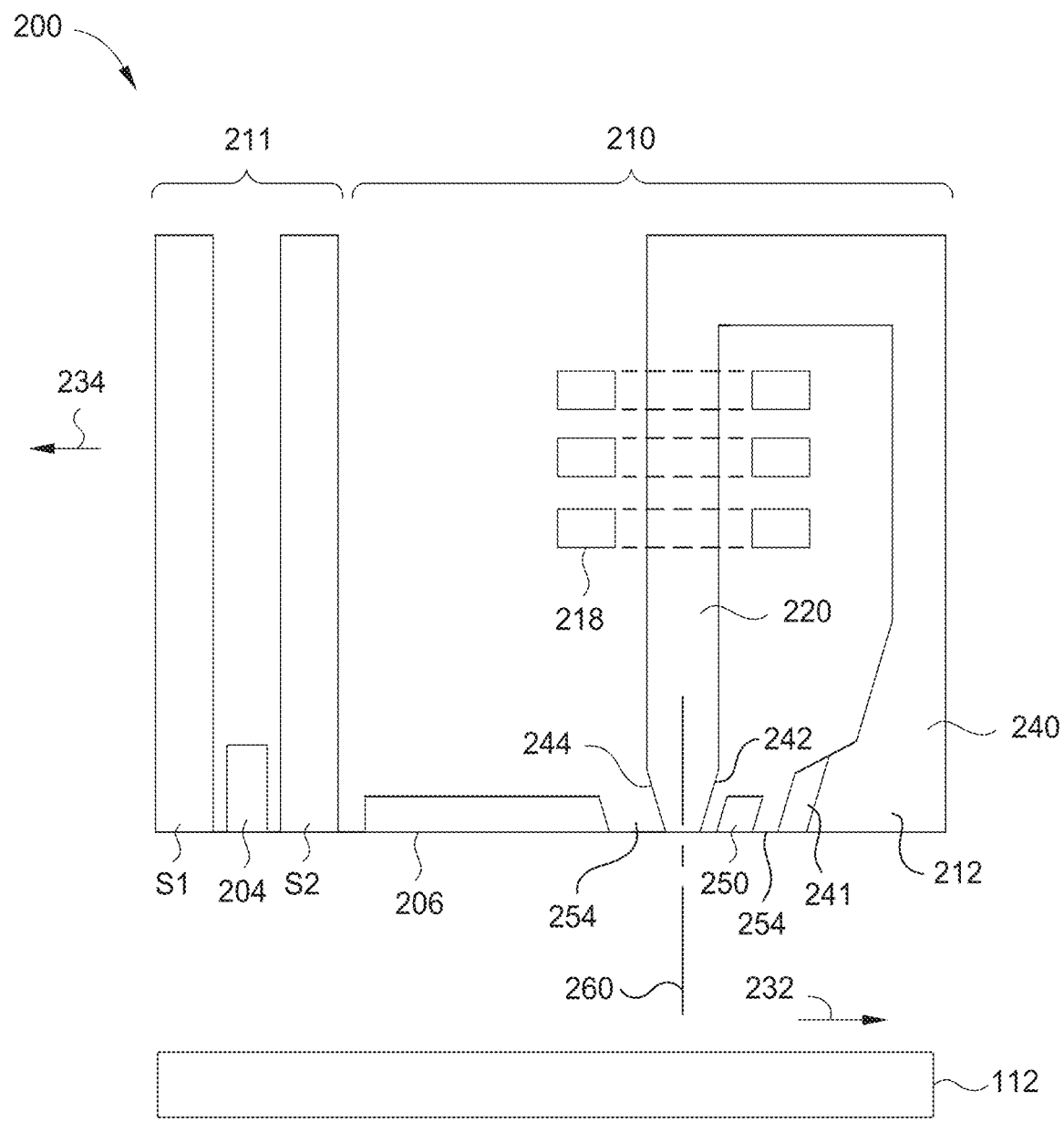
FIG. 2 is a fragmented, cross-sectional view of certain embodiments of a read/write head with a spintronic device.

At least one slider 113 is positioned near the magnetic disk 112, and each slider 113 supports one or more magnetic head assemblies 121, including a SOT device. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by a suspension 115. The suspension 115 provides a slight spring force which biases the slider 113 toward the disk surface 122. Each actuator arm 119 is attached to an actuator means 127. The actuator means 127, as shown in FIG. 2, may be a voice coil motor (VCM). The VCM includes a coil movable within a fixed magnetic field, the direction and speed of the coil movements being controlled by the motor current signals supplied by the control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115, and supports slider 113 off and slightly above the disk surface 122 by a small, substantially constant spacing during regular operation.

The various components of the disk drive 100 are operated by control signals generated by control unit 129, such as access control signals and internal clock signals. The control unit 129 typically comprises logic control circuits, storage means, and a microprocessor. The control unit 129 generates control signals to control various system operations such as drive motor control signals on line 123 and head position and seek control signals on line 128. The control signals on line 128 provide the desired current profiles to move optimally and position slider 113 to the desired data track on disk 112. Write and read signals are communicated to and from write and read heads on the assembly 121 by recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders.

FIG. 2 is a fragmented, cross-sectional side view of certain embodiments of a read/write head 200 having a SOT device. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232, and the read/write head 200 moves in the direction indicated by the arrow 234.

In some embodiments, the magnetic read head 211 is a magnetoresistive (MR) read head with an MR sensing element 204 located between MR shields S1 and S2. In other embodiments, the magnetic read head 211 is a magnetic tunnel junction (MTJ) read head that includes an MTJ sensing device 204 disposed between MR shields S1 and S2. The magnetic fields of the adjacent magnetized regions in the magnetic disk 112 are detectable by the MR (or MTJ) sensing element 204 as the recorded bits. The SOT device of various embodiments can be incorporated into the read head 211 as the sensing element. An example of a SOT read head is described in a co-pending patent application titled "Topological Insulator Based Spin Torque Oscillator Reader," U.S. application Ser. No. 17/828,226, filed May 31, 2022, assigned to the same assignee of this application, which is herein incorporated by reference. Another example of a SOT read head is described in co-pending patent applications titled "Non-Localized Spin Valve Reader Hybridized With Spin Orbit Torque Layer," U.S. application Ser. No. 18/367,877, filed Sep. 13, 2023, and "Non-Localized Spin Valve Multi-Free-Layer Reader Hybridized With Spin Orbit Torque Layers," U.S. application Ser. No. 18/367,882, filed Sep. 13, 2023, which is herein incorporated by reference.

The write head 210 includes a central or main pole 220, a leading shield 206, a trailing shield 240, an optional spin-orbital torque (SOT) device 250, and a coil 218 that excites the main pole 220. The coil 218 may have a "pancake" structure that winds around a back-contact between the main pole 220 and the trailing shield 240, instead of a "helical" structure shown in FIG. 2. For example, when included, e.g., to achieve a Microwave Assisted Magnetic Recording (MAMR) effect, the SOT device 250 is formed in a gap 254 between the main pole 220 and the trailing shield 240. In certain embodiments, the read/write head 200 additionally includes mechanisms (not shown) for supporting Heat Assisted Magnetic Recording (HAMR), which may include a waveguide coupled to a light source and a near field transducer (NFT) placed adjacent to the main pole 220 and coupled to the waveguide to convert the delivered light into a heating spot on the media.

The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may comprise magnetic materials, such as a NiFe alloy.

FIGS. 3A-3D illustrate spintronic stacks 300a-300d, respectively, according various embodiments. Each spintronic stack 300a-300d may be utilized in the magnetic media drive 100 of FIG. 1, in the reader, and/or writer portions of the head 200 of FIG. 2, or other suitable magnetic media drives. Each spintronic stack 300a-300d may be utilized in as a memory cell element in MRAM or as a logic cell, for example, as disclosed in FIGS. 6-7. Aspects of the spintronic stacks 300a-300d may be used in combination with one another.

FIG. 3A is a schematic illustration of a spintronic stack 300a according one embodiment. The spintronic stack 300a comprises an amorphous layer 302a, a buffer layer 302b, an SOT layer 304 disposed over the buffer layer 302b, an optional interlayer 306 disposed over the SOT layer 304, a ferromagnetic (FM) layer 308 disposed over the interlayer 306, and a cap layer 310 disposed over the FM layer 308. While the FM layer 308 is shown over the SOT layer 304, in some embodiments, the SOT layer 304 may be over the FM layer 308. In such embodiments, the location of the SOT layer 304 and the FM layers 308 are switched.

The stack 300a comprises an amorphous layer 302a, comprising NiTa NiW, NiFeTa, NiFeW, CoFeTa, or NiFeGe, which may have a high resistance property. In some embodiments, the amorphous layer 302a may be doped with nitrogen. This layer may be disposed on other seed or substrate layers.

The buffer layer 302b comprises multiple layers, such as three sub-layers. In one embodiment, a first buffer sub-layer 302b-1 and a second sub-buffer layer 302b-2 each individually comprises $Ta_3W$ (110), $TaW_3$ (100), $Ta_3WN$, $TaW_3N$, $Ta_3W_2$ (110), $TaW_2$ (100), $Ta_3W_2N$, $TaW_2N$, MgO (100), TiN (100), or YPt (110), each of which provides a (110) texture for a third sub-buffer layer 302b-3 and the SOT layer 304. The first buffer sub-layer 302b-1 may have a thickness of about 10 Å to about 20 Å, and the second buffer sub-layer 302b-2 may have a thickness of about 10 Å to about 30 Å. In such an embodiment, the third sub-buffer layer 302b-3 comprises HfN, $Ta_3W$ (110), $TaW_3$ (100), $Ta_3WN$, $TaW_3N$, or YPt (110). The third sub-layer 302b-3 may comprise HfN, $Ta_3WN$, or TiN, which has a high resistivity. The third buffer sub-layer 302b-3 has a thickness of about 10 Å to about 30 Å.

Each of the first, second, and third sub-buffer layers 302b-1, 302b-2, 302b-3 comprises a different material. For example, the first sub-buffer layer 302b-1 may comprise MgO or TiN, the second sub-buffer layer 302b-2 may comprise $Ta_3W$ or $Ta_3WN$, and the third sub-buffer layer 302b-3 may comprise HfN or TiN. As another example, the first sub-buffer layer 302b-1 may comprise YPt, $TaW_3$, or $TaW_3N$, the second sub-buffer layer 302b-2 may comprise $Ta_3W$, $Ta_3WN$, or HfN, and the third sub-buffer layer 302b-3 may comprise HfN, TiN, $Ta_3W$, or $Ta_3WN$.

In one embodiment, the interlayer 306 comprises Ta (e.g., Alpha-Ta) or Nb (similar or same material as buffer sub-layer 302b-3) is disposed on the SOT layer 304. In another embodiment, the interlayer 306 comprises $Ta_3W$ (110), $TaW_3$ (100), YPt (110), NiFeGeN, NiAlN, NiAl, NiFeGe, or HfN, which are high resistivity materials that provide shunt blocking for the FM layer 308. In some embodiments, the interlayer 306 may also comprise MgO, such as NiFeGe/MgO, NiFeGeN/MgO, $Ta_3WN$/MgO, or HfN/MgO. The interlayer 306 may be a multilayer structure, like described below in FIGS. 3C-3D. The interlayer 306 inherits the (110) orientation from the layers below.

The FM layer 308 disposed on the interlayer 306 comprises Co, CoFeB, NiFe, CoFe, CoFeN, CoFeHf, or other suitable ferromagnetic materials or alloys. Finally, the cap layer 310 can be multiple layers disposed on the FM layer 308, comprising (1) a material selected from the group consisting of high resistance amorphous SiN, $Al_2O_3$, $SiO_2$, NiFeTa, NiTa, NiW, NiFeW, NiFeGe, HfN, and NiFeGeN, or (2) high resistance crystalline ceramic materials, such as TiO, MgO, MgTiO layers, or (3) lower resistance transition heavy metals such as Pt, Co, Cu, Ni, Ru, Ta, Cr, Au, and Rh and alloys thereof, if used in combination with higher resistance cap layers, or (4) other non-magnetic materials, or combinations thereof. The SOT layer 304 comprises a topological semi-material (TSM), such as YBiPt (110).

FIG. 3B is a schematic illustration of a spintronic stack 300b according one embodiment. Spintronic stack 300b is similar to the stack 300a except that the buffer layer comprises different sub-layers 302b-2 and materials. The amorphous layer 302a is generally an amorphous or nanocrystalline migration inhibiting layer. The first sub-layer 302b-1 is a texturing template layer comprising heated YPt, fcc MgO, TiN, or a B2 alloy of RuAl. The second sub-layer 302b-2a is generally a bcc alloy comprising elements selected from the group consisting of: Ta, Hf, W, Nb, V, and Zr, or a bcc nitrided alloy forming an fcc compound, such as HfN or TaWN. The sublayers 302b-3, 302-2b, and 302b-2a are of similar materials comprising bcc alloys or nitride bcc alloys, forming fcc phases with larger lattice parameters. The sequence of these layers is selected to either reduce strain while increasing layer resistance or to improve migration in and out of the TSM SOT layer 304. Together they form a strain reducing layer that can easily force the (110) orientation growth as noted above, enabling the goal of growing highly textured (110) YBiPt Heusler film.

FIG. 3C is a schematic illustration of a spintronic stack 300c according one embodiment. Spintronic stack 300c is similar to the stack 300a of FIG. 3A; however, the buffer layer 302b comprises two sub-layers 302b-1 and 302b-2 and the interlayer 306 is a multilayer structure. The first sub-layer 302b-1 of the buffer layer 302b may comprise $Ta_3W$ (110), $TaW_3$ (100), $Ta_3W_2N$, $TaW_3N$, MgO (100), TIN (100), or YPt (110), each of which provide a (110) texture for the second sub-buffer layer 302b-2 and the SOT layer 304. The second buffer sub-layer 302b-2 comprises HfN, $Ta_3W$ (110), $Ta_3WN$, $TaW_3$ (100) $TaW_3N$, or YPt (110). In one embodiment, the second buffer sub-layer 302b-2 comprises HfN, which has a high resistivity. The first buffer sub-layer 302b-1 may have a thickness of about 10 Å to about 20 Å, and the second buffer sub-layer 302b-2 may have a thickness of about 10 Å to about 30 Å.

Each of the first and second sub-buffer layers 302b-1, 302b-2, comprises a different material. For example, the first sub-buffer layer 302b-1 may comprise MgO or TiN, and the second sub-buffer layer 302b-2 may comprise $Ta_3W$ or $TaW_3$. As another example, the first sub-buffer layer 302b-1 may comprise YPt, $TaW_3$, or $TaW_3N$, and the second sub-buffer layer 302b-2 may comprise $Ta_3W$, $Ta_3WN$, or HfN.

The interlayer 306 comprises two sub-interlayers 306a and 306b. In some embodiments, the first sub-layer 306a is a metal protecting layer and the second sub-layer 306b is an oxide layer. The first sub-interlayer 306a may comprise HfN, $Ta_3W$ (110), $TaW_3$ (100), or YPt (110). The second sub-interlayer 306b may comprise MgO, TiO, MgTiO, HfN, $Ta_3W$ (110), $TaW_3$ (100), or YPt (110). The first sub-interlayer 3026a may have a thickness of about 5 Å to about 10 Å, such as about 8 Å, and the second sub-interlayer 306b may have a thickness of about 1 Å to about 7 Å, such as about 4 Å.

Each of the first and second sub-interlayers 306a and 306b comprises $Ta_3W$ (110), $TaW_3$ (100), $Ta_3W_2N$, $TaW_2N$, YPt (110), NiFeGeN, NiAlN, NiAl, NiFeGe, or HfN. In some embodiments, the first and second sub-interlayers 306a and 306b may also comprise MgO, such as NiFeGe/MgO, NiFeGeN/MgO, $Ta_3WN$/MgO, or HfN/MgO. For example, the first sub-interlayer 306a may comprise $Ta_3W$ (110), $TaW_3$ (100), YPt (110), NiFeGeN, NiAlN, NiAl, NiFeGe, or HfN, and the second sub-interlayer 306b may comprise $Ta_3W$ or $TaW_3$.

FIG. 3D is a schematic illustration of a spintronic stack 300d according one embodiment. Spintronic stack 300d is similar to the stack 300c of FIG. 3C; however, the buffer layer 302b is a single layer and the interlayer 306 is a multilayer structure. The buffer layer 302b may comprise HfN, $Ta_3W$ (110), $TaW_3$ (100), $Ta_3W_2N$, $TaW_2N$, or YPt (110). The buffer layer 302b may have a thickness of about 30 Å to about 50 Å. The first sub-interlayer 306a of the interlayer 306 may comprise HfN, $Ta_3W$ (110), $TaW_3$ (100), or YPt (110). The second sub-interlayer 306b may comprise MgO, HfN, $Ta_3W$ (110), $TaW_3$ (100), or YPt (110). The first sub-interlayer 306a may have a thickness of about 10 Å to about 20 Å, and the second sub-interlayer 306b may have a thickness of about 20 Å to about 30 Å.

Each of the first and second sub-interlayers 306a, 306b comprises a different material. In some embodiments, the first sub-layer 306a is a metal protecting layer and the second sub-layer 306b is an oxide layer. For example, the first sub-interlayer 306a may comprise HfN, $Ta_3W$, or $TaW_3$, and the second sub-interlayer 306b may comprise YPt, MgO, TiO, or MgTiO.

FIG. 4A is a schematic illustration 400 of lattice matching of YBiPt (110) to Alpha-Ta (110), the highly textured sub-layer of the buffer layer above. YBiPt's molecules as shown in the illustration are marked as Y (202), Bi (204) and Pt (206). YBiPt (110) has a surface of 6.64 Å (Angstrom) by 9.39 Å, and the half-dimensions of this (110) surface is 3.32 Å×4.69 Å. As such, Alpha-Ta (110), which has the dimensions of 3.31 Å by 4.675 Å (illustration 408 as shown), provides for an excellent lattice-matching film. Table 410 shows the dimensions of other materials mentioned above as useable in various buffer and/or interlayer embodiments.

Figure 4B:
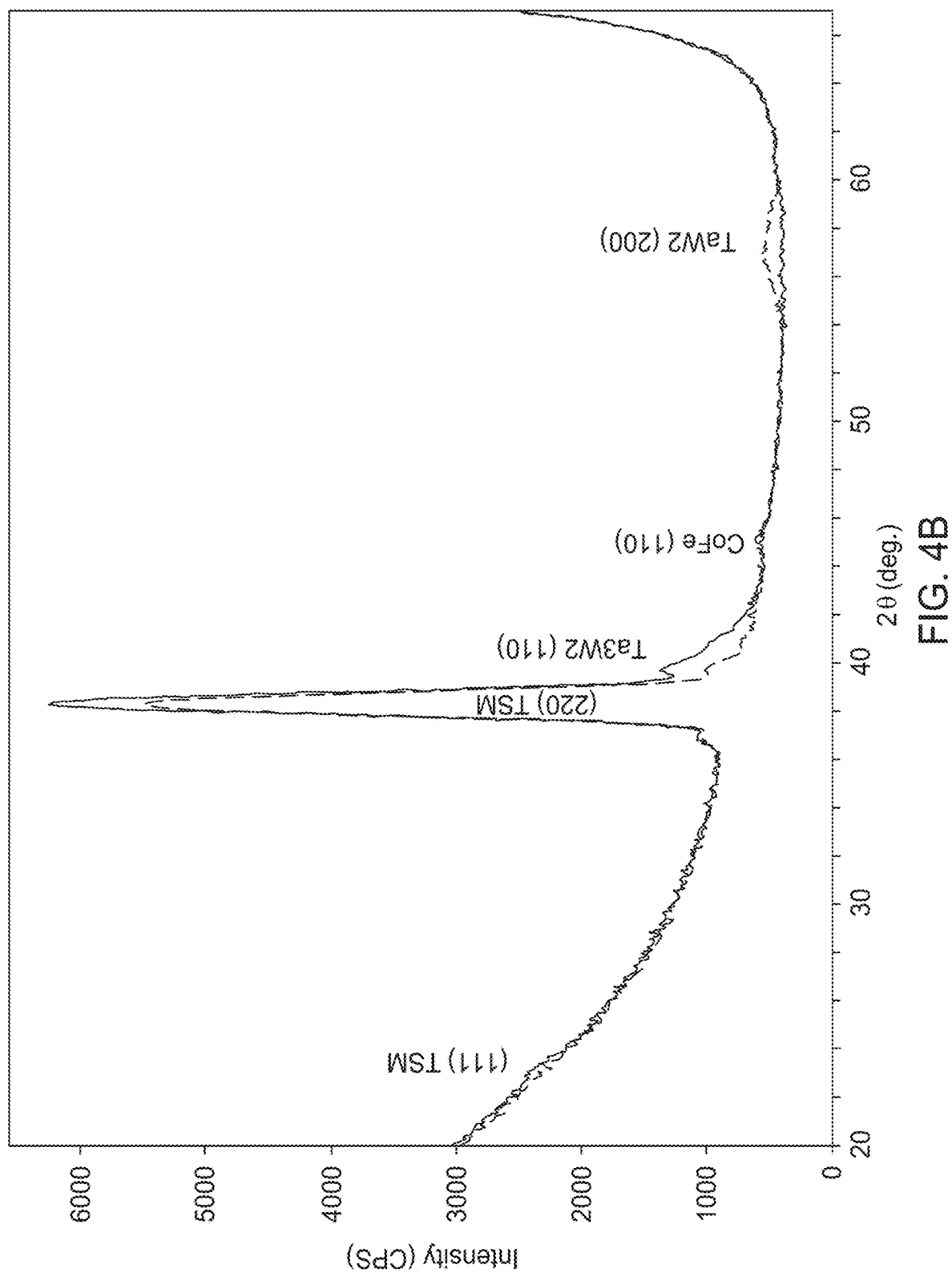
FIG. 4B illustrates out-of-plane XRD patterns of $Ta_3W$ (110) and $TaW_2$ (100) textured buffer layers in a (110) textured TSM SOT stacks, according to one embodiment.

FIG. 4B illustrates out-of-plane XRD patterns of $Ta_3W$ (110) and $TaW_2$ (100) textured buffer layers in a (110) textured TSM SOT stacks, according to one embodiment. As shown in the graph, a buffer layer comprising $Ta_3W$ is able to provide a (110) texture to the SOT layer, such as the SOT layer 304 of FIGS. 3A-3D. A buffer layer comprising $TaW_2$ is able to provide a (100) texture to the SOT layer 304.

Figure 4C:
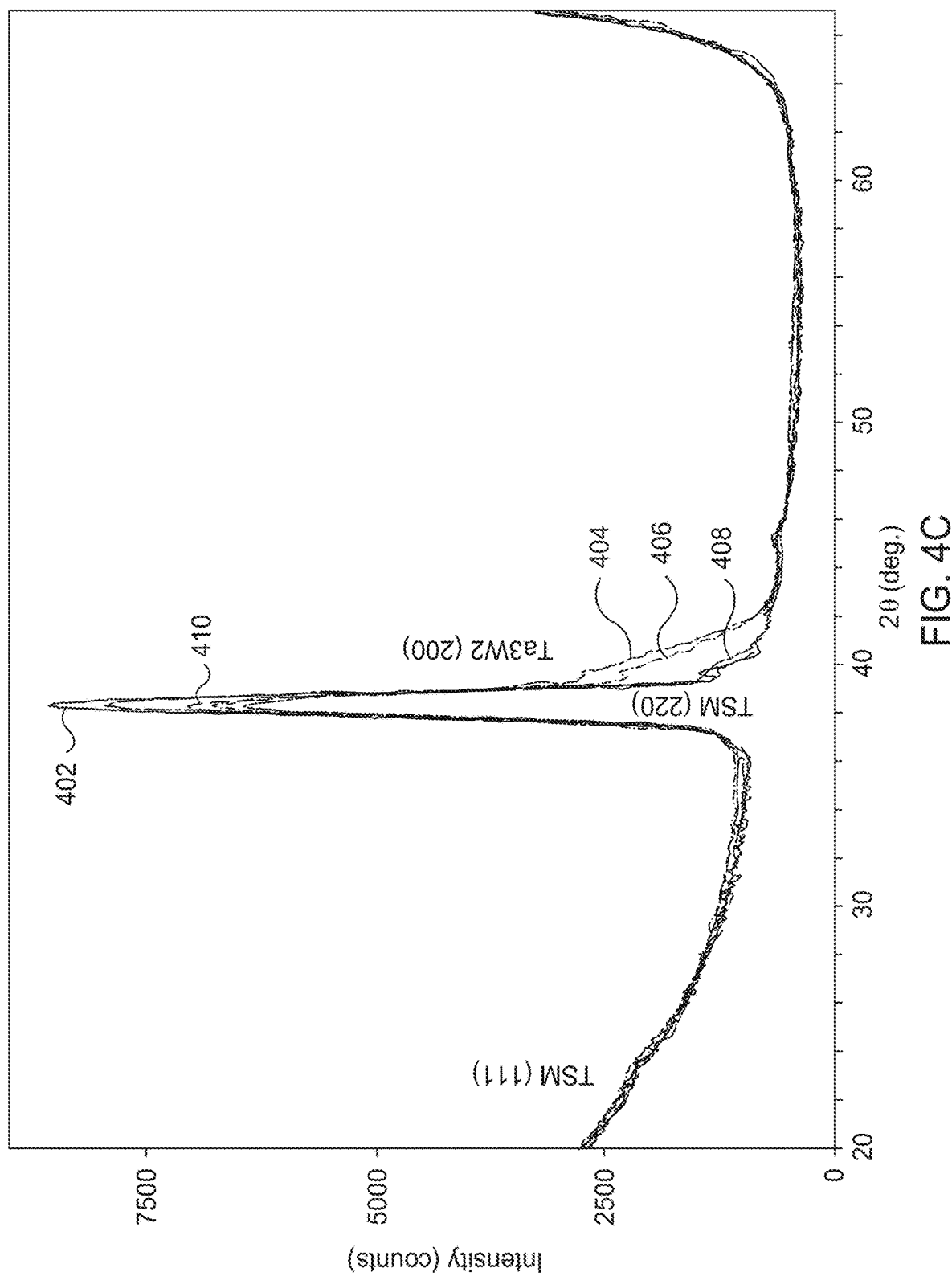
FIG. 4C illustrates out-of-plane XRD patterns of various texturing templates, buffer, interlayer, and capping layer of (110) textured TSM stacks, according to another embodiment.

FIG. 4C illustrates out-of-plane XRD patterns of various texturing templates, buffer, interlayer, and capping layer of (110) textured TSM stacks, according to another embodiment. Line 402 represents a stack comprising a 30 Å thick MgO layer, a 20 Å thick $TaW_2$ layer, a 100 Å thick YPtBi layer, a 6 Å thick CoFe layer, and a 30 Å thick NiFeGe layer. Line 404 represents a stack comprising a 10 Å thick CoFeTaN layer, a 10 Å thick YPt layer, a 30 Å thick HfN layer, a 10 Å thick $Ta_3W_2$ layer, a 100 Å thick YPtBi layer, a 10 Å thick CoFeB layer, a 10 Å thick NiFeGe layer, and a 40 Å thick HfN layer. Line 406 represents a stack comprising a 10 Å thick YPt layer, a 30 Å thick HfN layer, a 10 Å thick $Ta_3W_2$ layer, a 100 Å thick YPtBi layer, a 6 Å thick CoFe layer, a 10 Å thick NiFeGe layer, and a 20 Å thick HfN layer. Line 408 represents a stack comprising a 10 Å thick CoFeTaN layer, a 30 Å thick MgO layer, a 20 Å thick $Ta_3W_2$ layer, a 100 Å thick YPtBi layer, a 10 Å thick CoFeB layer, a 5 Å thick NiAlGeN layer, a 10 Å thick NiFeGe layer, and a 50 Å thick HfN layer. Line 410 represents a stack comprising a 10 Å thick CoFeTaN layer, a 10 Å thick YPt layer, a 30 Å thick $Ta_3W_2N$ layer, a 100 Å thick YPtBi layer, a 10 Å thick CoFeB layer, a 10 Å thick NiFeGe layer, and a 40 Å thick HfN layer.

It is noted that while FIGS. 3A-3D provide example stacks of a single pair of SOT and FM layers, in various sensor, memory and logic applications, other such embodiments may include stacks comprising a different number of SOT and FM layers, and the buffer layers and interlayers noted above for promotion of the discussed growth properties can be used accordingly to support those different embodiments.

Figure 5A:
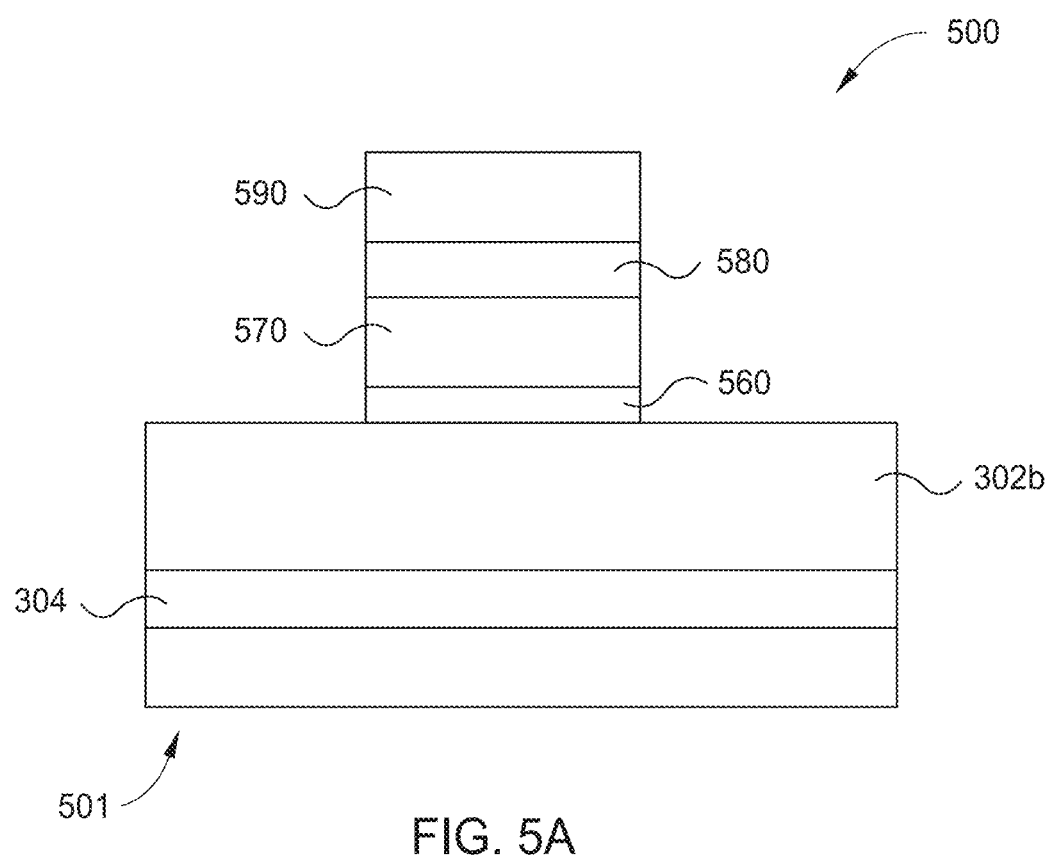
FIG. 5A is a schematic cross-sectional view of a SOT device for use in a MAMR magnetic recording head, such as the MAMR magnetic recording head of the drive of FIG. 1 or other suitable magnetic media drives.

FIG. 5A is a schematic cross-sectional view of a SOT device 500 for use in a MAMR magnetic recording head, such as the MAMR magnetic recording head of the drive 100 of FIG. 1 or other suitable magnetic media drives. The SOT device 500 comprises a SOT layer 304 orientation formed over a buffer layer 302b formed over a substrate 501, such as the SOT layer 304 and the buffer layer 302b of FIG. 3A-3D. Thus, the SOT layer 304 may comprise YPtBi having a (110) orientation. A spin torque layer (STL) 570 is formed over the SOT layer 304. The STL 570 comprises a ferromagnetic material such as one or more layers of CoFe, CoIr, NiFe, and CoFeX alloy wherein X=B, Ta, Re, or Ir.

In certain embodiments, an electrical current shunt block layer 560 is disposed between the SOT layer 304 and the STL 570. The electrical current shunt blocking layer 560 reduces electrical current from flowing from the SOT layer 304 to the STL 570 but allows spin orbital coupling of the SOT layer 304 and the STL 570. In certain embodiments, the electrical current shunt blocking layer 560 comprises a magnetic material that provides greater spin orbital coupling between the SOT layer 304 and the STL 570 than a non-magnetic material. In certain embodiments, the electrical current shunt blocking layer 560 comprises a magnetic material of FeCo, FeCOM, FeCOMO, FeCoMMeO, FeCOM/MeO stack, FeCoMNiMnMgZnFeO, FeCOM/NiMnMgZnFeO stack, multiple layers/stacks thereof, or combinations thereof in which M is one or more of B, Si, P, Al, Hf, Zr, Nb, Ti, Ta, Mo, Mg, Y, Cu, Cr, and Ni. Me is one or more of Si, Al, Hf, Zr, Nb, Ti, Ta, Mg, Y, or Cr. In certain embodiments, the electrical current shunt blocking layer 560 is formed to a thickness from about 10 Å to about 100 Å. In certain aspects, an electrical current shunt blocking layer 560 with a thickness of over 100 Å may reduce the spin-orbital coupling of the SOT layer 304 and the STL 570. In certain aspects, an electrical current shunt blocking layer having a thickness of less than 10 Å may not sufficiently reduce electrical current from SOT layer 304 to the STL 570.

In certain embodiments, additional layers are formed over the STL 570 such as a spacer layer 580 and a pinning layer 590. The pinning layer 590 can partially pin the STL 570. The pinning layer 590 comprises a single or multiple layers of PtMn, NiMn, IrMn, IrMnCr, CrMnPt, FeMn, other antiferromagnetic materials, or combinations thereof. The spacer layer 580 comprises single or multiple layers of magnesium oxide, aluminum oxide, other nonmagnetic materials, or combinations thereof.

Figure 5B:
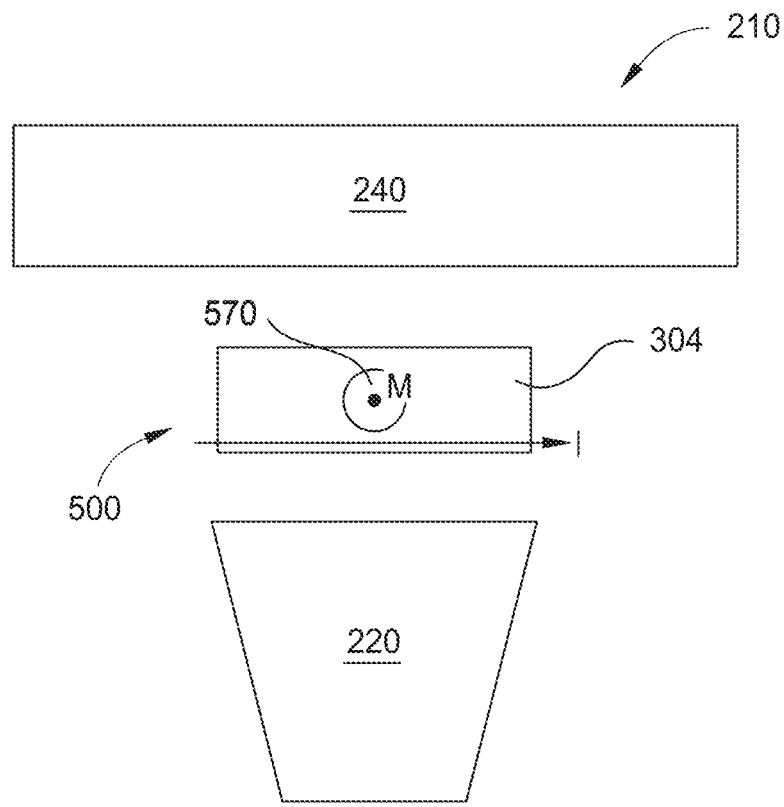
FIGS. 5B-5C are schematic MFS views of certain embodiments of a portion of a MAMR magnetic recording head with a SOT device of FIG. 5A.
Figure 5C:
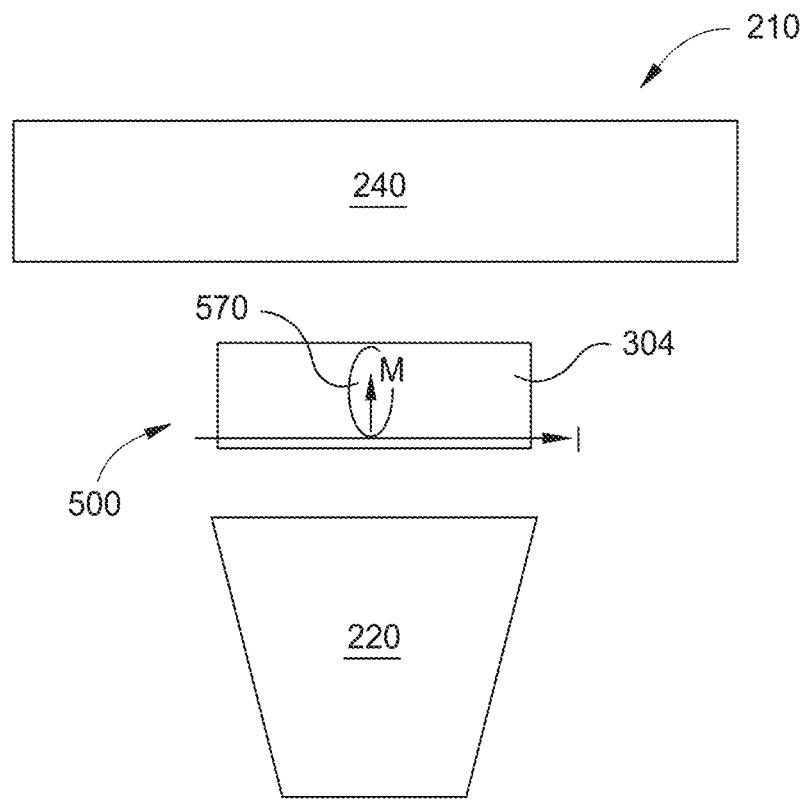

FIGS. 5B-5C are schematic MFS views of certain embodiments of a portion of a MAMR magnetic recording head 210 with a SOT device 500 of FIG. 5A. The MAMR magnetic recording head 210 can be the magnetic recording head FIG. 2 or other suitable magnetic recording heads in the drive 100 of FIG. 1 or other suitable magnetic media drives such as tape drives. The MAMR magnetic recording head 210 includes a main pole 220 and a trailing shield 240 in a track direction. The SOT device 500 is disposed in a gap between the main pole and the trailing shield 240.

During operation, charge current through a SOT layer 304 acting as a spin Hall layer generates a spin current in the YPtBi layer. The spin orbital coupling of the YPtBi layer and a spin torque layer (STL) 570 causes switching or precession of magnetization of the STL 570 by the spin orbital coupling of the spin current from the SOT layer 304. Switching or precession of the magnetization of the STL 570 can generate an assisting AC field to the write field. Energy-assisted magnetic recording heads based on SOT have multiple times greater power efficiency than MAMR magnetic recording heads based on spin transfer torque. As shown in FIG. 5B, an easy axis of a magnetization direction of the STL 570 is perpendicular to the MFS from shape anisotropy of the STL 570, from the pinning layer 590 of FIG. 5A, and/or from hard bias elements proximate to the STL 570. As shown in FIG. 5C, an easy axis of a magnetization direction of the STL 570 is parallel to the MFS from shape anisotropy of the STL 570, from the pinning layer 590 of FIG. 5A, and/or from complex bias elements proximate to the STL 570.

Figure 6:
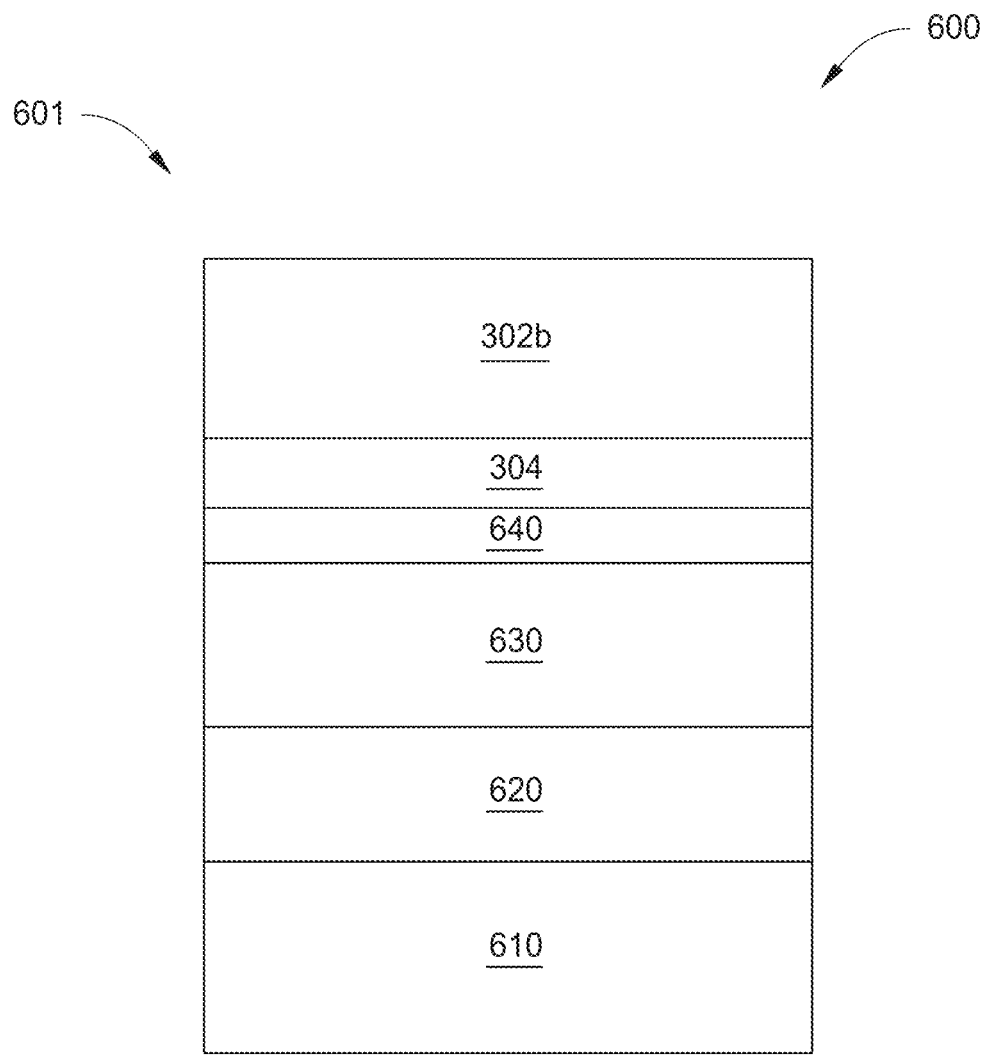
FIG. 6 is a schematic cross-sectional view of a SOT MTJ used as a MRAM device.

FIG. 6 is a schematic cross-sectional view of an SOT MTJ 601 used as a MRAM device 600. The MRAM device 600 comprises a reference layer (RL) 610, a spacer layer 620 over the RL 610, a recording layer 630 over the spacer layer 620, a buffer layer 302b over an electrical current shunt block layer 640 over the recording layer 630, and a SOT layer 304 over the buffer layer 302b. The SOT layer 304 and the buffer layer 302b may be the SOT layer 304 and the buffer layer 302b of FIGS. 3A-3D. Thus, the SOT layer 304 may comprise YPtBi having a (110) orientation.

The RL 610 comprises single or multiple layers of CoFe, other ferromagnetic materials, and combinations thereof. The spacer layer 620 comprises single or multiple layers of magnesium oxide, aluminum oxide, other dielectric materials, or combinations thereof. The recording layer 630 comprises single or multiple layers of CoFe, NiFe, other ferromagnetic materials, or combinations thereof.

As noted above, in certain embodiments, the electrical current shunt block layer 640 is disposed between the buffer layer 302b and the recording layer 630. The electrical current shunt blocking layer 640 reduces electrical current from flowing from the SOT layer 304 to the recording layer 630. The electrical current shunt blocking layer 640 still allows spin orbital coupling of the SOT layer 304 and the recording layer 630. For example, writing to the MRAM device can be enabled by the spin orbital coupling of the TSM layer and the recording layer 630, which allows switching of magnetization of the recording layer 630 by the spin orbital coupling of the spin current from the SOT layer 304. In certain embodiments, the electrical current shunt blocking layer 640 comprises a magnetic material that provides greater spin orbital coupling between the SOT layer 304 and the recording layer 630 than a nonmagnetic material. In certain embodiments, the electrical current shunt blocking layer 640 comprises a magnetic material of FeCOM, FeCOMO, FeCoMMeO, FeCOM/MeO stack, FeCoMNiMnMgZnFeO, FeCOM/NiMnMgZnFeO stack, multiple layers/stacks thereof, or combinations thereof, in which M is one or more of B, Si, P, Al, Hf, Zr, Nb, Ti, Ta, Mo, Mg, Y, Cu, Cr, and Ni; and Me is Si, Al, Hf, Zr, Nb, Ti, Ta, Mg, Y, or Cr.

The MRAM device 600 of FIG. 6 may include other layers, such as pinning layers, pinning structures (e.g., a synthetic antiferromagnetic (SAF) pinned structure), electrodes, gates, and other structures. Other MRAM devices besides the structure of FIG. 6 can be formed utilizing a SOT layer 304 over a buffer layer 302b to form a SOT MTJ 601.

Figure 7:
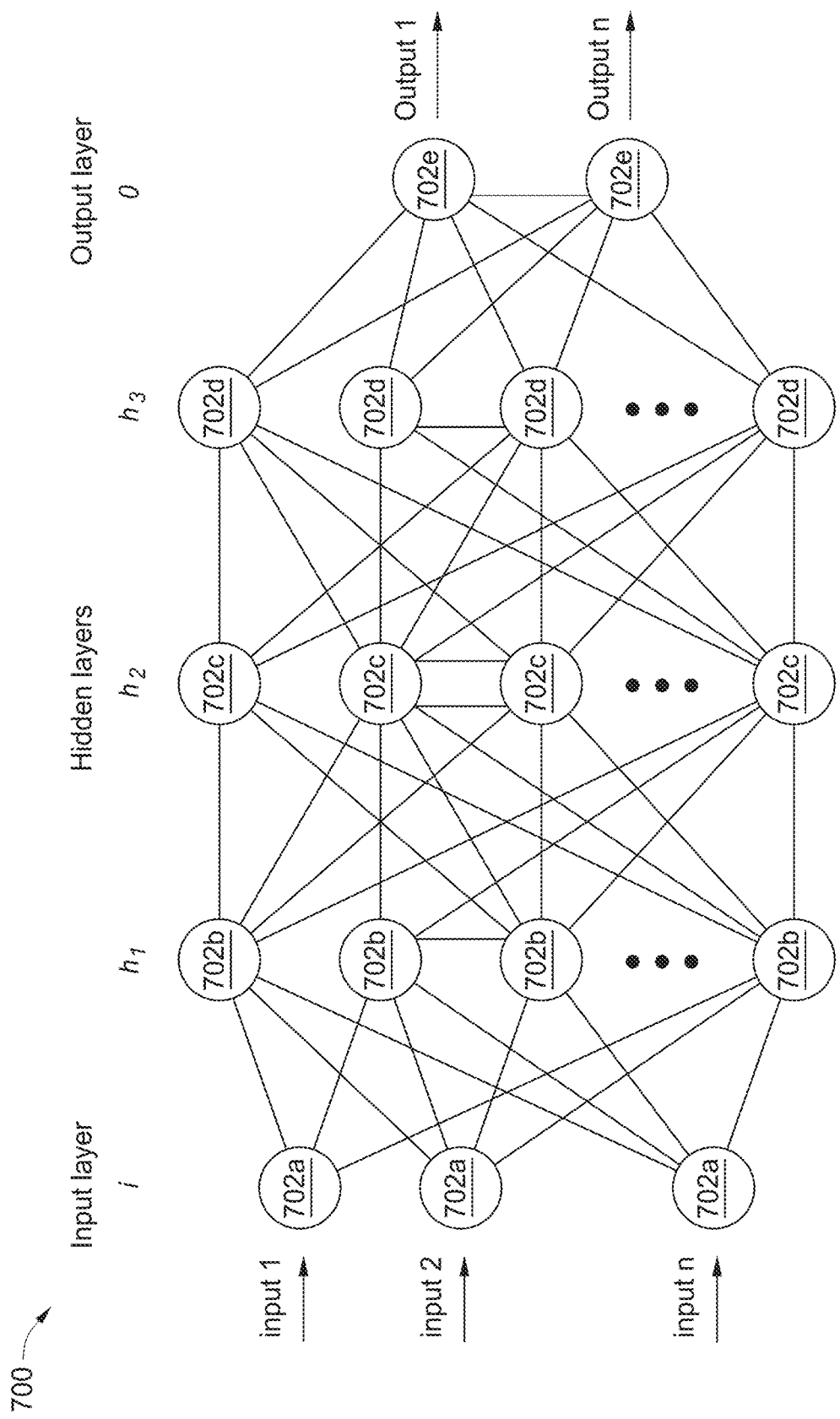
FIG. 7 illustrates a schematic of a simplified deep neural network (DNN) or logic device, according to one embodiment.

FIG. 7 illustrates a schematic of a simplified deep neural network (DNN) or logic cell 700, according to one embodiment. The DNN 700 comprises a plurality of cells or neural nodes 702a, 702b, 702c, 702d, 702e (collectively referred to herein as neural nodes 702). Each neural node 702 comprises a plurality of spin orbital-spin orbital (SO-SO) cells, where each SO-SO cell is a three-terminal device, comprising a control or weight, an input, and an output. Each SO-SO cell may comprise one or more of the spintronic stacks 300a-300d of FIGS. 3A-3D. An input current (input 1, input 2, input n) is applied to a first input layer (i) of neural nodes 702a and multiplied by the control or weight.

The output of each neural node 702a of the input layer is then output to each neural node 702b in a first hidden layer (h1) of the DNN 700 as the input for each neural node 702*b*, where each received input at each neural node 702*b* is then multiplied by a respective weight for the respective input of each neural node 702*b*. A weight may conceptually represent a strength of the connection between a neural node in one layer (e.g., neural node 702*a*) and another neural node in the next layer (e.g., neural node 702*b*). The results of the multiplications are collectively summed together and sent to a non-linear activation function (not shown here), such as a step or a rectified linear unit (ReLU) function, which determines the final output for that neural node 702*b*. This multiplication, summation and activation function sequence of processes is then repeated in the various layers h2, h3, etc. throughout the DNN. While three hidden layers are shown, the DNN 700 may comprise any number of hidden layers. Finally, the output of the last hidden layer (here, the third hidden layer) is output to output neural nodes 702*e* of an output layer (o) as a final result.

Figure 8:
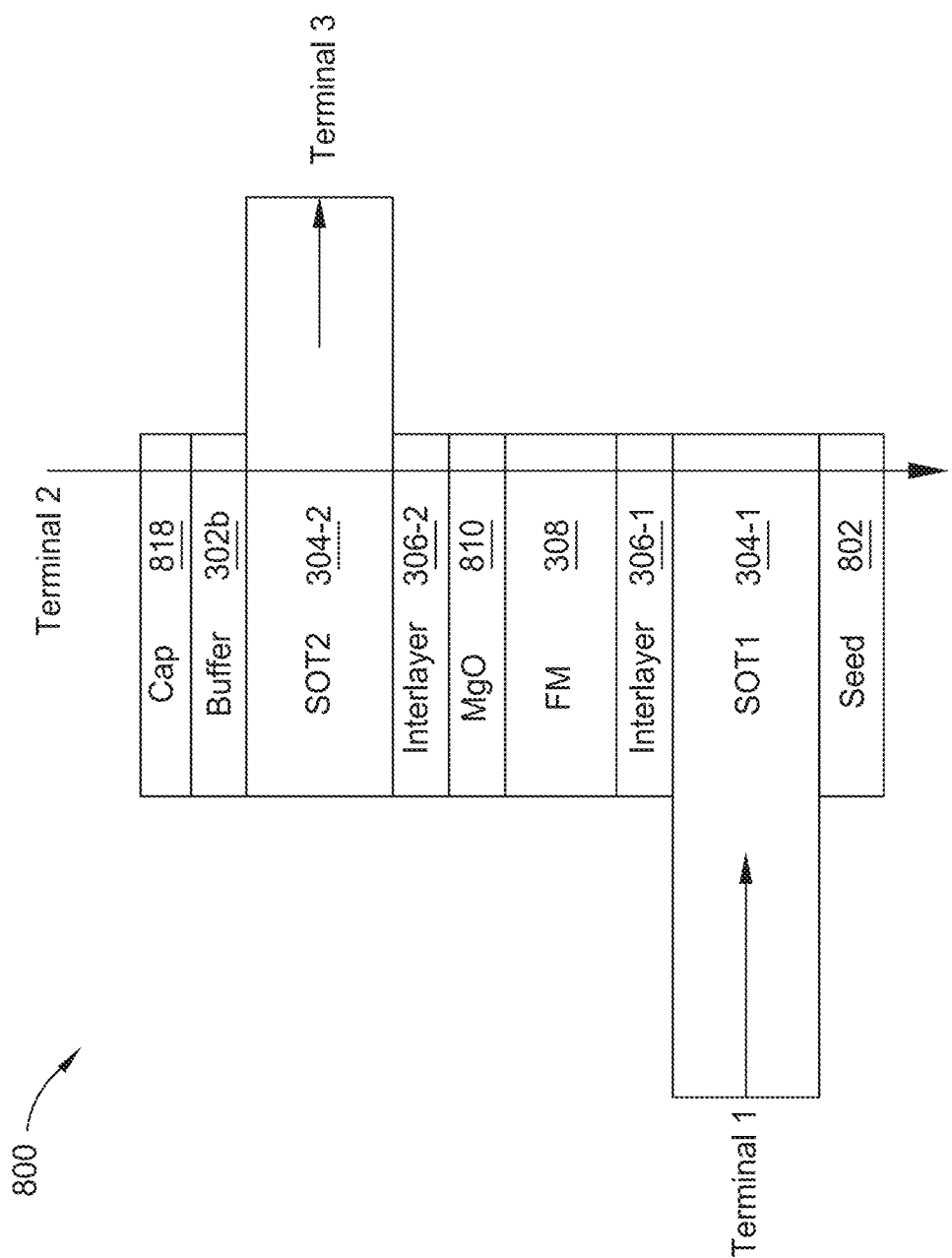
FIG. 8 illustrates a spin orbital-spin orbital (SO-SO) device, according to one embodiment.

FIG. 8 illustrates a spin orbital-spin orbital (SO-SO) device 800, according to one embodiment. The SO-SO device 800 may be utilized within the DNN 700 of FIG. 7, such as a SO-SO cell. The various layers of the SO-SO device 800 are not drawn to scale, and are intended for illustrative purposes only. The SO-SO devices may be referred to herein as SOT devices. A plurality of SO-SO devices 800 may be configured to function as a neural node 102 of FIG. 7. Thus, a collection of SO-SO devices may be configured to represent a layer (i, h1, h2, h3, o) of the DNN of FIG. 7.

In some embodiments, the SO-SO device 800 comprises a seed layer 802, a first spin orbit torque (SOT) layer 304-1 (SOT1) disposed on the seed layer 802, a first interlayer 306-1 disposed on the first SOT layer 304-1, a ferromagnetic (FM) layer 308 disposed on the first interlayer 306-1, an oxide layer 810 (e.g., an MgO layer) disposed on the FM layer 308, a second interlayer 306-2 disposed on the oxide layer 810, a second SOT layer 304-2 (SOT2) disposed on the second interlayer 306-2, a buffer layer 302*b* disposed on the second SOT layer 304-2, and a cap layer 818 disposed on the buffer layer 302*b*. The oxide layer 810 may comprise other materials, such as oxides of Ti, V, Cr, Mn, Fe, Ni, Zr, nitrides of Sc, Ti, V, Cr, Fe, Zr, Ta, Hf, W, carbides of Sc, Ti, V, Zr, Ta, Hf, W, and alloy combinations thereof.

The first and second interlayers 306-1, 306-2 may each individually be the interlayer 306 of FIGS. 3A-3D. The butter layer 302 may be any buffer layer 302*b* of FIGS. 3A-3D. The SOT1 304-1 and the SOT2 304-2 may each individually be the SOT layer 304 of FIGS. 3A-3D. The FM layer 308 may be the FM layer 308 of FIGS. 3A-3D.

In some embodiments, the SO-SO device 800 comprises three terminals or interconnects. The first SOT layer 304-1 is coupled to an interconnect or terminal 1. The second SOT layer 304-2 is coupled to an interconnect or terminal 3, where the interconnect or terminal 3 is coupled to the first SOT layer 304-1 of a second SO-SO device via terminal 1. An input current is applied to terminal 2 (representing an input Xn current to a neural node) and it flows out-of-plan (current-perpendicular-to-plane (CPP)) through the whole stack toward the seed layer 802. The arrows associated with the terminals indicate the direction of current flows, according to some embodiments. The interconnects or terminals serves as connection points for joining two or more SO-SO devices. Thus, multiple SO-SO devices 800-800 can be arranged to build out various circuits.

By utilizing the aforementioned materials for the buffer layer and/or sub-buffer layers, the SOT layer is able to grow in a (110) orientation while maintaining a high resistivity. Furthermore, utilizing the aforementioned materials for the interlayer and/or sub-interlayers, the interlayer has a high resistivity and can function as a shunt blocking layer.

In one embodiment, a spintronic stack comprises a buffer layer comprising a textured layer comprising Ta or Nb, a spin orbit torque (SOT) layer comprising YBiPt in the (110) orientation disposed over the buffer layer, an interlayer disposed over the SOT layer, and a ferromagnetic layer disposed over the interlayer.

The buffer further comprises a first sub-layer comprising Ta, a second sub-layer disposed over the first sub-layer, comprising Cr, and a third sub-layer, the textured layer, disposed over the second sub-layer, comprising Ta or Nb. The Ta in the first sub-layer is Beta-Ta and the Ta in the third sub-layer is Alpha-Ta. The Beta-Ta of the third sub-layer is thicker than the Alpha-Ta of the first sub-layer. The buffer further comprises a first sub-layer comprising Ta, a second sub-layer disposed over the first sub-layer, comprising Cr, V, Mo, or alloys thereof, a third sub-layer disposed over the second sub-layer, comprising Mo, W, WTi, or alloys thereof, and a fourth sub-layer, the textured layer, disposed over the third sub-layer, comprising Ta or Nb. The Ta in the first sub-layer is Beta-Ta and the Ta in the fourth sub-layer is Alpha-Ta. The Beta-Ta of the fourth sub-layer is thicker than the Alpha-Ta of the first sub-layer. The spintronic stack further comprises an amorphous layer comprising CoX, CoFeX, NiX, or NiFeX, where X is one or more of Ta, W, Hf, and Ge, wherein the amorphous layer is nitrogenated, and wherein buffer layer is disposed over the amorphous layer. The interlayer comprises Ta or Nb. A memory cell comprises the spintronic stack. A logic cell comprises the spintronic stack. A magnetic sensor comprises the spintronic stack.

In another embodiment, a spintronic stack comprises a buffer layer comprising $Ta_3W$ (110), $TaW_3$ (100), $Ta_3WN$, $TaW_3N$, MgO (100), TiN (100), or YPt, a spin orbit torque (SOT) layer comprising YBiPt in the (110) orientation disposed over the buffer layer, an interlayer disposed over the SOT layer, and a ferromagnetic layer disposed over the interlayer.

The buffer layer is a multilayer stack. The buffer layer further comprises a first sub-layer comprising $Ta_3W$ (110), $TaW_3$ (100), or YPt (110), and a second sub-layer comprising HfN, $Ta_3W$ (110), $TaW_3$ (100), or YPt (110). The second sub-layer comprises HfN, and the first and second sub-layers comprise different materials. The buffer layer further comprises a third sub-layer disposed between the first sub-layer and the second sub-layer, the third sub-layer comprising $Ta_3WN$ (110), $TaW_3N$ (100), TiN, or YPt (110). The interlayer comprises one or more materials selected from the group consisting of: HfN, $Ta_3W$ (110), $TaW_3$ (100), NiFeGe, NiAlGe or YPt (110), MgO, TiN, TiO, MgTiO, or MgTiN. A memory cell comprises the spintronic stack. A logic cell comprises the spintronic stack. A magnetic sensor comprises the spintronic stack.

In yet another embodiment, a spintronic stack at least one amorphous non-magnetic migration barrier layer comprising CoX, CoFeX, NiX, or NiFeX, where X is one of Ta, W, Hf, or Ge, a buffer layer disposed on the at least one amorphous non-magnetic migration barrier layer, the buffer layer comprising (1) a texturing template layer comprising MgO (100), TiN (100), RuAl (100), or YPt disposed over the at least one amorphous non-magnetic migration barrier layer, and (2) two or more textured sub-layers disposed over the texturing template layer, the two or more textured sub-layers each individually comprising a bcc alloy selected from the group consisting of: Ta, W, Nb, V, and Hf, or a fcc alloy nitride compounds of Ta, W, Nb, V, and Hf, a spin orbit torque (SOT) layer comprising YBiPt in the (110) orientation disposed over the buffer layer, an interlayer disposed over the SOT layer, the interlayer comprising a first sub-layer and a second sub-layer, the first sub-layer comprising a material selected from the group consisting of: $Ta_3WN$, $TaW_3N$, $Ta_3W$ (110), $TaW_3$ (100), YPt (110), NiFeGeN, NiAlN, NiAl, NiFeGe, NiAlGe, and HfN, and the second sub-layer being an oxide layer, a ferromagnetic layer disposed over the second sub-layer of the interlayer, and a capping layer disposed over the ferromagnetic layer A first sub-layer of the two or more textured sub-layers comprises $Ta_3W$ (110), $TaW_3$ (100), or YPt (110), and wherein a second sub-layer of the two or more textured sub-layers comprises HfN, $Ta_3W$ (110), $TaW_3$ (100), or YPt (110). The buffer layer further comprises a third sub-layer disposed between the first sub-layer and the second sub-layer, the third sub-layer comprising $Ta_3WN$ (110), $TaW_3N$ (100), TiN, or YPt (110), and wherein the third sub-layer comprises a different material than the first and second sub-layers. The interlayer comprises two or more sub-interlayers. A first sub-interlayer comprises HfN, $Ta_3W$ (110), $TaW_3$ (100), or YPt (110), and a second sub-interlayer comprises MgO, HfN, $Ta_3W$ (110), $TaW_3$ (100), or YPt (110). The interlayer further comprises a third sub-interlayer, the third sub-interlayer comprising MgO, HfN, $Ta_3W$ (110), $TaW_3$ (100), or YPt (110), and wherein the first, second, and third sub-interlayers each comprise a different material. The interlayer further comprises one or more of TiN, TiO, MgTiO, or MgTiN. A memory cell comprises the spintronic stack. A logic cell comprises the spintronic stack. A magnetic sensor comprises the spintronic stack.

While the foregoing is directed to embodiments of the present disclosure, other and further embodiments of the disclosure may be devised without departing from the basic scope thereof, and the scope thereof is determined by the claims that follow.

What is claimed is:

1. A spintronic stack, comprising:
   a buffer layer comprising a textured layer comprising Ta or Nb;
   a spin orbit torque (SOT) layer comprising YBiPt in the (110) orientation disposed over the buffer layer;
   an interlayer disposed over the SOT layer; and
   a ferromagnetic layer disposed over the interlayer.

2. The spintronic stack of claim 1, wherein the buffer further comprises:
   a first sub-layer comprising Ta;
   a second sub-layer disposed over the first sub-layer, comprising Cr; and
   a third sub-layer, the textured layer, disposed over the second sub-layer, comprising Ta or Nb.

3. The spintronic stack of claim 2, wherein the Ta in the first sub-layer is Beta-Ta and the Ta in the third sub-layer is Alpha-Ta.

4. The spintronic stack of claim 3, wherein the Beta-Ta of the third sub-layer is thicker than the Alpha-Ta of the first sub-layer.

5. The spintronic stack of claim 1, wherein the buffer further comprises:
   a first sub-layer comprising Ta;
   a second sub-layer disposed over the first sub-layer, comprising Cr, V, Mo, or alloys thereof;
   a third sub-layer disposed over the second sub-layer, comprising Mo, W, WTi, or alloys thereof; and
   a fourth sub-layer, the textured layer, disposed over the third sub-layer, comprising Ta or Nb.

6. The spintronic stack of claim 5, wherein the Ta in the first sub-layer is Beta-Ta and the Ta in the fourth sub-layer is Alpha-Ta.

7. The spintronic stack of claim 5, wherein the Beta-Ta of the fourth sub-layer is thicker than the Alpha-Ta of the first sub-layer.

8. The spintronic stack of claim 1, further comprising an amorphous layer comprising CoX, CoFeX, NiX, or NiFeX, where X is one or more of Ta, W, Hf, and Ge, wherein the amorphous layer is nitrogenated, and wherein buffer layer is disposed over the amorphous layer.

9. The spintronic stack of claim 1, wherein the interlayer comprises Ta or Nb.

10. A memory cell comprising the spintronic stack of claim 1.

11. A logic cell comprising the spintronic stack of claim 1.

12. A magnetic sensor comprising the spintronic stack of claim 1.

13. A spintronic stack, comprising:
   a buffer layer comprising HfN, $Ta_3W$ (110), $TaW_3$ (100), $Ta_3WN$, $TaW_3N$, MgO (100), TiN (100), or YPt;
   a spin orbit torque (SOT) layer comprising YBiPt in the (110) orientation disposed over the buffer layer;
   an interlayer disposed over the SOT layer; and
   a ferromagnetic layer disposed over the interlayer.

14. The spintronic stack of claim 13, wherein the buffer layer is a multilayer stack.

15. The spintronic stack of claim 13, wherein the buffer layer further comprises:
   a first sub-layer comprising $Ta_3W$ (110), $TaW_3$ (100), or YPt (110); and
   a second sub-layer comprising HfN, $Ta_3W$ (110), $TaW_3$ (100), or YPt (110).

16. The spintronic stack of claim 15, wherein the second sub-layer comprises HfN, and wherein the first and second sub-layers comprise different materials.

17. The spintronic stack of claim 15, wherein the buffer layer further comprises a third sub-layer disposed between the first sub-layer and the second sub-layer, the third sub-layer comprising $Ta_3WN$ (110), $TaW_3N$ (100), TiN, or YPt (110).

18. The spintronic stack of claim 13, wherein the interlayer comprises one or more materials selected from the group consisting of: HfN, $Ta_3W$ (110), $TaW_3$ (100), NiFeGe, NiAlGe or YPt (110), MgO, TiN, TiO, MgTiO, or MgTiN.

19. A memory cell comprising the spintronic stack of claim 13.

20. A logic cell comprising the spintronic stack of claim 13.

21. A magnetic sensor comprising the spintronic stack of claim 13.

22. A spintronic stack, comprising:
   an amorphous layer comprising CoX, CoFeX, NiX, or NiFeX, where X is one or more of Ta, W, Hf, and Ge;
   a buffer layer disposed over the amorphous layer, the buffer layer comprising:
   (1) a texturing template layer comprising MgO (100), TiN (100), RuAl (100), or YPt disposed over the amorphous layer; and
   (2) two or more textured sub-layers disposed over the texturing template layer, the two or more textured sub-layers each individually comprising a material selected from the group consisting of: a bcc alloy of Ta, W, Nb, V, and Hf, and a fcc alloy nitride compounds of Ta, W, Nb, V, and Hf;

a spin orbit torque (SOT) layer comprising YBiPt in the (110) orientation disposed over the buffer layer;

an interlayer disposed over the SOT layer, the interlayer comprising a first sub-layer and a second sub-layer, the first sub-layer comprising a material selected from the group consisting of: $Ta_3WN$, $TaW_3N$, $Ta_3W$ (110), $TaW_3$ (100), YPt (110), NiFeGeN, NiAlN, NiAl, NiFeGe, NiAlGe, and HfN, and the second sub-layer being an oxide layer;

a ferromagnetic layer disposed over the second sub-layer of the interlayer; and a capping layer disposed over the ferromagnetic layer.

23. The spintronic stack of claim 22, wherein a first sub-layer of the two or more textured sub-layers comprises $Ta_3W$ (110), $TaW_3$ (100), or YPt (110), and wherein a second sub-layer of the two or more textured sub-layers comprises HfN, $Ta_3W$ (110), $TaW_3$ (100), or YPt (110).

24. The spintronic stack of claim 23, wherein the buffer layer further comprises a third sub-layer disposed between the first sub-layer and the second sub-layer, the third sub-layer comprising $Ta_3WN$ (110), $TaW_3N$ (100), TiN, or YPt (110), and wherein the third sub-layer comprises a different material than the first and second sub-layers.

25. The spintronic stack of claim 22, wherein the interlayer comprises two or more sub-interlayers.

26. The spintronic stack of claim 25, wherein a first sub-interlayer comprises HfN, $Ta_3W$ (110), $TaW_3$ (100), or YPt (110), and wherein a second sub-interlayer comprises MgO, HfN, $Ta_3W$ (110), $TaW_3$ (100), or YPt (110).

27. The spintronic stack of claim 26, wherein the interlayer further comprises a third sub-interlayer, the third sub-interlayer comprising MgO, HfN, $Ta_3W$ (110), $TaW_3$ (100), or YPt (110), and wherein the first, second, and third sub-interlayers each comprise a different material.

28. The spintronic stack of claim 26, wherein the interlayer further comprises one or more of TiN, TiO, MgTiO, or MgTiN.

29. A memory cell comprising the spintronic stack of claim 22.

30. A logic cell comprising the spintronic stack of claim 22.

31. A magnetic sensor comprising the spintronic stack of claim 22.

* * * * *